Jan. 28, 1969    D. M. MEDFORD    3,424,594
LETTUCE CRISPER AND METHOD UTILIZING SAME
Filed March 16, 1965

INVENTOR.
DOYLE M. MEDFORD

BY *Kimmel, Crowell & Weaver*
ATTORNEYS.

_United States Patent Office_

3,424,594
Patented Jan. 28, 1969

3,424,594
LETTUCE CRISPER AND METHOD UTILIZING SAME
Doyle M. Medford, 4155 Krupp Drive, Apt. B, El Paso, Tex. 79902
Filed Mar. 16, 1965, Ser. No. 440,204
U.S. Cl. 99—154
Int. Cl. A23l 1/02
4 Claims

ABSTRACT OF THE DISCLOSURE

A lettuce crisper including the combination of a container and a lid having a downwardly extending flange sized to fit the interior shape of said container, a truncated spherical upper secured to the periphery of said flange and a spout on the apex of said upper for the introduction of water.

---

Figure 1:
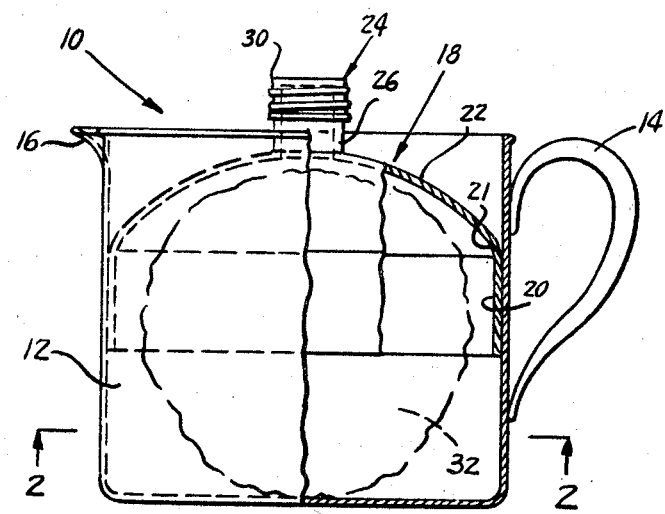

This invention relates to the preservation of perishable fruits and vegetables and more particularly to the preservation of heads of lettuce.

One difficulty experienced by housewives interested in practicing economies in the home is that heads of lettuce, when stored in a conventional vegetable drawer of a refrigerator, rapidly deteriorate thus causing much spoilage and wastage. This spoilage normally occurs because of a lack of moisture in the air and because of the exposure of the head of lettuce to the air.

It is, accordingly, one object of the instant invention to provide a lettuce crisper which obviates the rapid spoilage of an individual head of letture when stored in the common refrigerator in the home.

It is another object of the instant invention to provide a lettuce crisper in which a head of lettuce may be conveniently retained in an encompassing body of water.

It is another object of the instant invention to provide a lettuce crisper that is inexpensive to make, it requires no maintenance and it is convenient to use.

Other objects and advantages of this invention reside in the arrangement of parts and features of construction and operation, all as will be more fully pointed out hereinafter and disclosed in the accompanying drawing wherein there is shown a preferred embodiment of this inventive concept.

Figure 2:
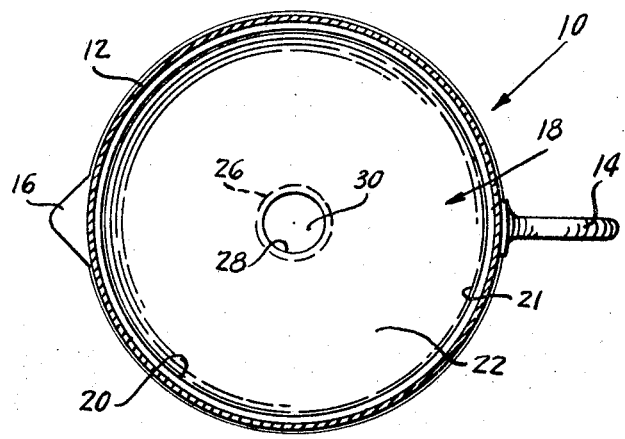

In the drawing:

FIGURE 1 is a side elevational view of a lettuce crisper embodying the instant invention, certain parts being broken away for purposes of clarity of illustration; and FIGURE 2 is a sectional view of the device of FIGURE 1, taken substantially along line 2—2 and viewed in the direction of the arrows, the head of lettuce shown in FIGURE 1 being removed for purposes of illustration.

Referring now to the accompanying drawing, wherein like reference characters indicate like elements, there is shown generally at 10 a lettuce crisper of the instant invention comprising a container 12 which is shown generally as cylindrical, but which may be made of any convenient geometric shape. Container 12 is shown as having a handle 14 and a spout 16 disposed on opposite sides of container 12. Although a conventional pitcher-shaped handle is shown, the cylindrical container 12 may be provided with any conventional handling means, such as an enlarged radially extending rim secured about the upper end of container 12.

It is essential that the container 12 be of a size to conveniently accommodate a head of lettuce interiorly therein but not of such a size as to require undue space in a conventional refrigerator. Accordingly, the container 12 is between 6 and 10 inches in diameter and between 6 and 10 inches tall. If container 12 were to be of another geometric shape, its minimum horizontal distance should be within the same range.

As shown in FIGURE 1, a lid or cover shown generally at 18 is disposed interiorly of cylindrical container 12, both of which may be made of any convenient material such as plastic or the like. Lid 18 comprises a downwardly extending flange 20 which is shaped to fit the interior configuration of container 12 and provides a close sliding fit between cover 18 and container 12. Secured about the upper periphery 21 of downwardly extending flange 20 is an upper or top 22 which comprises a truncated spherical geometric portion, which is peculiarly adapted for storing lettuce since its interior configuration substantially conforms to that of a head of lettuce. Secured at the apex of upper 22 is a spout shown generally at 24 which provides a means of communication from within the volume of cover 18 to a point outside the lettuce crisper 10. Spout 24 comprises an upwardly extending tube 26 surrounding an aperture 28 in upper 22. Tube 26 has disposed on the outer sides thereof screw threads or the like for the reception of a screw cap 30. It is understood that any convenient means may be used to close the upper end of tube 26 or aperture 28 such as a plastic or cork stopper, or the like.

In the operation and use of the lettuce crisper of the instant invention, a head of lettuce 32 is placed interiorly of container 12 and followed by a convenient amount of water that is preferably cool. Cover 18 is then prepared for insertion into container 12 by the removal of screw cap 30. Cover 18 is placed at the upper end of container 12 and gradually forced downwardly into the interior thereof, thus forcing any air collected in the volume beneath upper 22 through tube 26. As the water in container 12 is contacted by cover 18, it is likewise forced upwardly and around lettuce head 32.

When substantially all the air has been removed from beneath upper 22 and the water in container 12 completely surrounds lettuce head 32, screw cap 30 may then be securely fastened about the screw threads provided on tube 26. Since lettuce head 32 is completely surrounded by a body of water, the contact of air with the head of lettuce is prevented along with the concomitant rapid deterioration and spoilage. The close sliding fit of cover 18 and container 12 precludes the inadvertent and undesirable entrance of air from the outside of letuce crisper 10 into the interior thereof. At this time lettuce crisper 10 with head of lettuce 32 therein may be placed in a conventional refrigerator for storage. It has been found that such a means of storing lettuce will preserve the lettuce for domestic use for many days longer than the conventional storage of lettuce in a vegeable drawer of a common refrigerator.

When it is desired to use the lettuce head for meal preparation, lettuce crisper 10 is removed from the refrigerator and placed on a convenient working surface, such as a drainboard. Since lid 18 is relatively immobile within container 12, by the creation of a suction if lid 18 is raised and by the incompressibility of water in container 12 if lid 18 is lowered, screw cap 30 is removed from tube 26 to allow the entrance of air under upper 22 thus facilitating the removal of lid 18. Lettuce head 32 may then be conveniently removed and the water in container 12 may be poured from the container by grasping the handle 14 and pouring over the spout 16 into a sink. Lettuce crisper 10 may then be washed along with other dishes to provide a conveniently reusable sanitary lettuce crisper.

From the foregoing it will be seen that there is provided an improved lettuce crisper which accomplishes all of the objects of this invention and others, including many advantages of practical utility and commercial importance.

As many embodiments may be made within this inventive concept, and as many modifications may be made in the embodiment herein before shown and described, it is to be understood that all matter herein is to be interpreted merely as illustrative and not in a limiting sense.

I claim:
1. In combination, a lettuce crisper comprising a container and a lid having a downwardly extending flange complementarily sized to closely fit the interior shape of said container, a truncated spherical upper secured to the periphery of said downwardly extending flange and a spout on the apex of said truncated spherical upper, said container being of a size that closely accommodates a large lettuce head.

2. The device of claim 1 wherein said container has a minimum horizontal dimension of between six and ten inches.

3. A method of preserving lettuce utilizing an open top container and an interiorly fitting closure having an aperture therein comprising the steps of: placing water and a head of lettuce in said container, placing said interiorly fitting closure in the open top of said container, pushing downwardly on said closure until said water completely surrounds said head of lettuce, and then closing said aperture.

4. In combination, a container having a bottom wall and at least one side wall and forming an open top; a lid comprising a downwardly extending flange closely fitted within said container, a top secured along the upper periphery of said flange and a spout on the apex of said top and providing communication between the outside of said container and the inside thereof; and a head of lettuce within said container.

References Cited
UNITED STATES PATENTS

| | | |
|---|---|---|
| 219,279 | 9/1879 | Lefferts. |
| 2,226,105 | 12/1940 | Gillespie. |
| 2,745,217 | 5/1956 | Gold et al. 99—154 |

RAYMOND N. JONES, *Primary Examiner.*

J. M. HUNTER, *Assistant Examiner.*

U.S. Cl. X.R.

222—572; 99—171